United States Patent
Pope et al.

(10) Patent No.: US 9,003,053 B2
(45) Date of Patent: Apr. 7, 2015

(54) MESSAGE ACCELERATION

(71) Applicant: Solarflare Communications, Inc., Irvine, CA (US)

(72) Inventors: Steven L. Pope, Costa Mesa, CA (US); David J. Riddoch, Huntingdon (GB)

(73) Assignee: Solarflare Communications, Inc., Irvine, CA (US)

( * ) Notice: Subject to any disclaimer, the term of this patent is extended or adjusted under 35 U.S.C. 154(b) by 213 days.

(21) Appl. No.: 13/624,788

(22) Filed: Sep. 21, 2012

(65) Prior Publication Data

US 2013/0080651 A1 Mar. 28, 2013

Related U.S. Application Data (60) Provisional application No. 61/538,055, filed on Sep. 22, 2011.

(51) Int. Cl.
*G06F 15/16* (2006.01)
*H04L 29/06* (2006.01)
*H04L 29/08* (2006.01)

(52) U.S. Cl.
CPC .............. *H04L 69/161* (2013.01); *H04L 69/12* (2013.01); *H04L 69/32* (2013.01)

(58) Field of Classification Search
USPC ........................................................ 709/231
See application file for complete search history.

(56) References Cited

U.S. PATENT DOCUMENTS

| | | |
|---|---|---|
| 5,272,599 A | 12/1993 | Koenen |
| 5,325,532 A | 6/1994 | Crosswy et al. |
| 5,946,189 A | 8/1999 | Koenen et al. |

(Continued)

FOREIGN PATENT DOCUMENTS

| | | |
|---|---|---|
| EP | 620521 A2 | 10/1994 |
| EP | 2463782 A2 | 6/2012 |

(Continued)

OTHER PUBLICATIONS

Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

(Continued)

*Primary Examiner* — Tu Nguyen
(74) *Attorney, Agent, or Firm* — Haynes Beffel & Wolfeld LLP; Warren S. Wolfeld (57) ABSTRACT

A data processing system comprising: a host computing device supporting an operating system and a network protocol stack, the network protocol stack being operable to support one or more transport streams by performing transport stream protocol processing of data packets received over the streams; a network interface device arranged to couple the host computing device to a network and operable to receive data packets over a transport stream supported by the network protocol stack; and a message engine configured to perform upper layer protocol processing; wherein the network interface device is configured to, on receiving a data packet over one of a predetermined set of transport streams, pass the payload data of the data packet to the message engine and the message engine is configured to, in response to receiving the payload data, identify and process any upper layer messages in the payload data in accordance with the upper layer protocol.

40 Claims, 1 Drawing Sheet

(56) References Cited

U.S. PATENT DOCUMENTS

| | | | |
|---|---|---|---|
| 6,098,112 A | 8/2000 | Ishijima et al. | |
| 6,160,554 A | 12/2000 | Krause | |
| 6,304,945 B1 | 10/2001 | Koenen | |
| 6,349,035 B1 | 2/2002 | Koenen | |
| 6,427,173 B1 | 7/2002 | Boucher et al. | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,502,870 B1* | 3/2009 | Chu | 709/250 |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,636,703 B2 | 12/2009 | Taylor | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,702,629 B2 | 4/2010 | Cytron et al. | |
| 7,725,556 B1 | 5/2010 | Schlansker et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,835,380 B1 | 11/2010 | Aloni et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,945,528 B2 | 5/2011 | Cytron et al. | |
| 7,954,114 B2 | 5/2011 | Chamberlain et al. | |
| 7,978,606 B2 | 7/2011 | Buskirk et al. | |
| 8,000,336 B2 | 8/2011 | Harel | |
| 8,156,101 B2 | 4/2012 | Indeck et al. | |
| 8,286,193 B2 | 10/2012 | Pope et al. | |
| 8,326,816 B2 | 12/2012 | Colle et al. | |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0033588 A1 | 2/2003 | Alexander | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0086300 A1 | 5/2003 | Noyes et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0015502 A1 | 1/2004 | Alexander et al. | |
| 2004/0071250 A1 | 4/2004 | Bunton et al. | |
| 2004/0141642 A1 | 7/2004 | Zeng et al. | |
| 2004/0156393 A1 | 8/2004 | Gupta et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210670 A1* | 10/2004 | Anerousis et al. | 709/238 |
| 2004/0210754 A1 | 10/2004 | Barron et al. | |
| 2004/0240435 A1 | 12/2004 | Boucher et al. | |
| 2004/0249881 A1 | 12/2004 | Jha et al. | |
| 2004/0249998 A1 | 12/2004 | Rajagopalan et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0188351 A1 | 8/2007 | Brown et al. | |
| 2007/0220183 A1 | 9/2007 | Kagan et al. | |
| 2007/0237327 A1 | 10/2007 | Taylor et al. | |
| 2007/0260602 A1 | 11/2007 | Taylor | |
| 2007/0277036 A1 | 11/2007 | Chamberlain et al. | |
| 2008/0008205 A1 | 1/2008 | Jung et al. | |
| 2008/0024586 A1 | 1/2008 | Barron | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0140574 A1 | 6/2008 | Boucher et al. | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0060197 A1 | 3/2009 | Taylor et al. | |
| 2009/0165003 A1 | 6/2009 | Jacobson et al. | |
| 2009/0182683 A1 | 7/2009 | Taylor et al. | |
| 2009/0183057 A1 | 7/2009 | Aizman | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0287628 A1 | 11/2009 | Indeck et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |

(56) References Cited

U.S. PATENT DOCUMENTS

| | | |
|---|---|---|
| 2010/0188140 A1 | 7/2010 | Smeloy |
| 2010/0189206 A1 | 7/2010 | Kagan |
| 2010/0198850 A1 | 8/2010 | Cytron et al. |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0102245 A1 | 4/2012 | Gole et al. |
| 2012/0246052 A1 | 9/2012 | Taylor et al. |
| 2013/0007000 A1 | 1/2013 | Indeck et al. |

FOREIGN PATENT DOCUMENTS

| | | | |
|---|---|---|---|
| WO | 00/10095 | A1 | 2/2000 |
| WO | 0148972 | A1 | 7/2001 |
| WO | 0235838 | A1 | 5/2002 |
| WO | 2008127672 | A2 | 10/2008 |
| WO | 2009134219 | A1 | 11/2009 |
| WO | 2009136933 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.

Bruce Lowekamp, et al., "Topology discovery for large ethernet networks," ACM SIGCOMM Computer Communication Review—Proc. 2001 SIGCOMM conf., vol. 31, No. 4, Oct. 1, 2001, pp. 237-248.

Piyush Shivam, et al., "EMP: Zero-copy OS-bypass NIC-driven Gigabit Ethernet Message Passing," Proc. 2001 ACM/IEEE Conf. on Supercomputing, Denver, Nov. 10, 2001 (8 pp).

Robert Ross, et al., "A Case Study in Application I/O on Linux Clusters," Proc. 2001 ACM/IEEE Conf. on Supercomputing, Denver, Nov. 10, 2001, 17pp.

E. Blanton and M. Allman, "On Making TCP More Robust to Packet Reordering," ACM Computer Communication Review, vol. 32, No. 1, Jan. 2, 2002, pp. 20-30.

Murali Rangarajan, et al., "TCP Servers: Offloading TCP Processing in Internet Servers. Design, Implementation, and Performance," Technical Report DCR-TR-481, Computer Science Department, Rutgers University, Mar. 2, 2002, 14 pp.

Jon Crowcroft, Derek McAuley, "ATM: A Retrospective on Systems Legacy or 'A technology with a fabulous future behind it?'", ACM Computer Communication Review, vol. 32, No. 5, Nov. 2, 2002, pp. 11-12. (introduces 4 articles spanning pp. 13-27; by Kalmanek pp. 13-19, Grossman pp. 21-24, Crosby et al. pp. 25-28, and Smith pp. 29-37).

Charles Kalmanek; ACM Computer Communication Review, vol. 32, No. 5, pp. 13-19, Nov. 2, 2002.

Jonathan Smith; ACM Computer Communication Review, vol. 32, No. 5, pp. 29-37, Nov. 2, 2002.

NR Adiga, et al., "An Overview of the BlueGene/L Supercomputer," Proceedings of the 2002 ACM/IEEE conference on Supercomputing, Baltimore, Nov. 16, 2002, pp. 1-22.

Steven J. Sistare, Christopher J. Jackson; Proceedings of the 2002 ACM/IEEE conference on Supercomputing, p. 1-15, Baltimore, Nov. 16, 2002.

R. Bush, D. Meyer; IETF Network Working Group, Request for Comments memo: 3439 [extending RFC1958], Dec. 2002, Some Internet Architectural Guidelines and Philosophy, 25 pp, The Internet Society (c)2002.

Pasi Sarolahti, et al., "F-RTO: an enhanced recovery algorithm for TCP retransmission timeouts," ACM Computer Communication Review, vol. 33, No. 2, Apr. 3, 2003, pp. 51-63.

Tom Kelly; ACM Computer Communication Review, vol. 33, No. 2, pp. 83-91, Apr. 3, 2003.

Jeffrey C. Mogul; Proceedings of HotOS IX: The 9th Workshop on Hot Topics in Operating Systems, pp. 25-30, May 18, 2003.

Derek McAuley, Rolf Neugebauer, "A case for virtual channel processors," NICELI '03 Proc.of the ACM SIGCOMM workshop, Aug. 2003, pp. 237-242.

Justin Hurwitz, Wu-chun Feng, "Initial end-to-end performance evaluation of 10-Gigabit Ethernet," Proc. 11th Symposium on High Performance Interconnects, Aug. 20, 2003, pp. 116-121.

Vinay Aggarwal, et al., summary, NICELI workshop, ACM SIGCOMM Computer Communication Review, vol. 33, No. 5, Oct. 3, 2003, pp. 75-80.

Wu-chun Feng, et al., "Optimizing 10-Gigabit Ethernet for Networks of Workstations, Clusters, and Grids: A Case Study," Proceedings of the 2003 ACM/IEEE conference on Supercomputing, Phoenix, Arizona, Nov. 15, 2003, 13 pp.

Jiuxing Liu, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp. 58-71.

Srihari Makineni and Ravi Iyer; Proceedings of the 10th International Symposium on High Performance Computer Architecture, pp. 152, Feb. 14, 2004.

Cheng Jin, et al.; Proceedings of IEEE Infocom 2004, pp. 1246-1259, Mar. 7, 2004.

Andy Currid, "TCP Offload to the Rescue," ACM Queue, vol. 2, No. 3, May 1, 2004, pp. 58-65.

Greg Regnier, et al.; Computer, IEEE Computer Society, vol. 37, No. 11, pp. 48-58, Nov. 4, 2004.

Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp including exhibits (declaration is 25 pp).

Edward D. Lazowska, David A. Patterson, "Computing Research: A Looming Crisis," ACM Computer Communication Review, vol. 35, No. 2, Jul. 5, 2005, pp. 65-68.

W. Feng, et al., "Permormance characterization of a 10-Gigabit Ethernet TOE," Proc. 13th Symp. on High Performance Interconnects, Aug. 17, 2005, pp. 58-63.

B. Leslie, et al., "User-level Device Drivers: Achieved Performance," J. Comput. Sci. & Technol., vol. 20, Sep. 5, 2005, 17pp.

P. Balaji, et al., "Head-to TOE Evaluation of High-Performance Sockets over Protocol Offload Entines," Proceedings of the IEEE International Conference on Cluster Computing, Sep. 5, 2005, 10pp.

Humaira Kamal, et al., "SCTP versus TCP for MPI," Proc.2005 ACM/IEEE conference on Supercomputing, Seattle, Washington, Nov. 12, 2005, 14pp.

Sumitha Bhandarkar, et al., "LTCP: Improving the Permormance of TCP in Highspeed Networks," ACM Computer Communication Review, vol. 36, No. 1, Jan. 6, 2006, pp. 41-50.

H. K. Jerry Chu, "Zero-Copy TCP in Solaris," Proc. USENIX Annual Technical Conference, Jan. 1996, 13pp.

Ken Calvert; ACM Computer Communication Review, vol. 36, No. 2, pp. 27-30, Apr. 6, 2006.

(56) References Cited

OTHER PUBLICATIONS

Jon Crowcroft; ACM Computer Communication Review, vol. 36, No. 2, pp. 51-52, Apr. 6, 2006.
Greg Minshall, et al.; ACM Computer Communication Review, vol. 36, No. 3, pp. 79-92, Jul. 6, 2006.
David Wetherall; ACM Computer Communication Review, vol. 36, No. 3, pp. 77-78, Jul. 6, 2006.
Patrick Geoffray, "A Critique of RDMA," HPCWire article, Aug. 18, 2006, 7pp. Available at http://www.hpcwire.com/hpcwire/2006-08-18/a_critique_of_rdma-1.html.
Geoffray P., "Protocol off-loading vs on-loading in high-performance networks," 14th Symposium on High Performance Interconnects, Aug. 23, 2006, 5pp.
Jose Carlos Sancho, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.
Sayantan Sur, et al., "High-Performance and Scalable MPI over InfiniBand with Reduced Memory Usage; An In-Depth Performance Analysis," Proc. 2006 ACM/IEEE conference on Supercomputing, Tampa, Florida, Nov. 11, 2006, 13pp.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller, "The end of history," IEEE Gigabit Networking Workshop, INFOCOM 2001, Anchorage, Alaska, Apr. 22, 2001.
M.V. Wilkes and R.M. Needham, "The Cambridge Model Distributed System," ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
C. A. Thekkath, et al., "Implementing network protocols at user level," ACM Computer Communication Review, vol. 23, No. 4, Oct. 1993, pp. 64-73.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, pp. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon, "Atomic: A High Speed Local Communication Architecture," Journal of High Speed Networks, vol. 3:1 (1994), pp. 1-28.
Gregory G. Finn and Paul Mockapetris, "Netstation Architecture Multi-Gigabit Workstation Network Fabric," Proceedings of InterOp '94, Las Vegas, Nevada, May 1994, 9pp.
Stuart Wray, et al.; Proceedings of the International Conference on Multimedia Computing and Systems, p. 265-273, Boston, May 1994.
"MPI: A Message-Passing Interface Standard," various forum members, Message-Passing Interface Forum, University of Tennessee, Knoxville, May 5, 1994 (corrected version), 239 pp.
Raj K. Singh, et al.; ACM Computer Communication Review, vol. 24, No. 3, p. 8-17, Jul. 1994.

P. Druschel, et al. "Experiences with a high-speed network adaptor: a software perspective," ACM Computer Communication Review, vol. 24, No. 4, Oct. 1994, pp. 2-13.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L.S. Brakmo, et al., "TCP Vegas: new techniques for congestion detection and avoidance," ACM Computer Communication Review, vol. 24, No. 4, Oct. 1994, p. 24-35.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al., "Performance of High-Speed Network I/O Subsystems: Case Study of a Fibre Channel Network," Proc.1994 Conf. on Supercomputing, Washington D.C., Nov. 14, 1994, pp. 174-183.
Nanette J. Boden, et al.; Draft of paper published in IEEE Micro, vol. 15, No. 1, pp. 29-36, 1995, Nov. 15, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir, "Experiences implementing a high performance TCP in user-space," ACM Computer Communication Review, vol. 25, No. 4, Oct. 1995, pp. 196-205.
J. C. Mogul, "The case for persistent-connection HTTP," ACM Computer Communication Review, vol. 25, No. 4, Oct. 1995, pp. 299-313.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham, "Devices in a Multi-Service Operating System," Ph.D. thesis, University of Cambridge, Jul. 1996, 142pp.
Chi-Chao Chang, et al., "Low-Latency Communication on the IBM RISC System/6000 SP," Proc. 1996 ACM/IEEE conference on Supercomputing, Pittsburgh, Nov. 17, 1996, 17pp.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al., "Avalon: An Alpha/Linux Cluster Achieves 10 Gflops for $150k," Proc. 1998 ACM/IEEE conference on Supercomputing, Orlando, Florida, Nov. 7, 1998, 10pp.
John Salmon, et al., "Scaling of Beowulf-class Distributed Systems," Proc. 1998 ACM/IEEE conference on Supercomputing, Orlando, Florida, Nov. 7, 1998, 18pp.
Derek Chiou, Boon S. Ang, et al., "StarT-Voyager: A Flexible Platform for Exploring Scalable SMP Issues," Proc. 1998 ACM/IEEE conference on Supercomputing, Orlando, Florida, Nov. 7, 1998, 20pp.
S. L. Pope, et al., "Enhancing Distributed Systems with Low-Latency Networking," Parallel and Distributed Computing and Networks, Brisbane, Australia, Dec. 1998, 10pp.

(56) References Cited

OTHER PUBLICATIONS

M. de Vivo, et al.; ACM Computer Communication Review, vol. 29, No. 1, pp. 81-85, Jan. 1999.
M. Allman, "TCP Byte Counting Refinements," ACM Computer Communication Review, vol. 29, No. 3, Jul. 1999, pp. 14-22.
Steve Muir and Jonathan Smith, "Piglet: A Low-Intrusion Vertical Operating System," Technical Report MS-CIS-00-04, University of Pennsylvania, Jan. 2000, 15pp.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap, "The Failure of TCP in High-Performance Computational Grids," Proc. 2000 ACM/IEEE conference on Supercomputing, Dallas, Texas, Nov. 4, 2000, 11p.
Jenwei Hsieh, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.
Ian Pratt and Keir Fraser; Proceedings of IEEE Infocom 2001, pp. 67-76, Apr. 22, 2001.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
EP 12185546.4—Extended European Search Report dated Jul. 13, 2013, 6 pages.
"NVIDIA Tesla GPUs to Communicate Faster Over Mellanox InfiniBand Networks," press release dated Nov. 25, 2009, Portland OR, 3 pp: <http://gpgpu.org/2009/11/25/nvidia-tesla-mellanox-infiniband>.
"NVIDIA GPUDirect™ Technology—Accelerating GPU-based Systems," Mellanox Tech. Brief, May 2010, 2pp: <http://www.mellanox.com/pdf/whitepapers/TB_GPU_Direct.pdf>.
Pope, S.L. et al., "Enhancing Distributed Systems with Low-Latency Netowrking," Olivetti and Oracle Research Laboratory, Cambridge Univ. May 1998, 12 pp: <http://www.cl.cam.ac.uk/research/dtg/www/publications/public/files/tr.98.7.pdf>.
Hodges, S.J. et al., "Remoting Peripherals using Memory-Mapped Networks," Olivetti and Oracle Research Laboratory, Cambridge Univ., 1998, 3 pp: <http://www.cl.cam.ac.uk/research/dtg/www/publications/public/files/tr.98.6.pdf>.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo, "The Aloha system," ACM Computer Communication Review, vol. 4 No. 1, Jan. 1974, pp. 5-8.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.

Robert K. Brandriff, et al.; "Development of a TCP/IP for the IBM/370," ACM SIGCOMM Computer Communication Review, vol. 15, No. 4, Sep. 1985, pp. 2-8.
C. Kline, "Supercomputers on the internet: a case study," ACM Computer Communication Review, vol. 17, No. 5, Aug. 1987, pp. 27-33.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley, "Protocol Design for High Speed Networks," Ph.D. Thesis, University of Cambridge, Sep. 1989, 104 pp.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie, "A host-network interface architecture for ATM," ACM Computer Communication Review, vol. 21, No. 4, Sep. 1991, pp. 307-315.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson, "The Evolution of XTP," Proceedings of the Third International Conference on High Speed Networking, Nov. 1991, 10 pp.
Michael J. Dixon, "System support for multi-service traffic," University of Cambridge Computer Laboratory Technical Report No. 245, Jan. 1992, 113 pp.
Danny Cohen, Gregory Finn, Robert Felderman, Annette DeSchon; Made available by authors, Jan. 10, 1992, "Atomic: A Local Communication Network Created through Repeated Application of Multicomputing Components," 11 pp + cover.
Gene Tsudik; ACM Computer Communication Review, vol. 22, No. 5, pp. 29-38, Oct. 1992.
Peter Steenkiste, "Analyzing communication latency using the Nectar communication processor," ACM Computer Communication Review, vol. 22, No. 4, Oct. 1992, pp. 199-209.
Paul E. McKenney and Ken F. Dove, "Efficient demultiplexing of incoming TCP packets," ACM Computer Communication Review, vol. 22, No. 4, Oct. 1992, pp. 269-279.
Erich Ruetsche and Matthias Kaiserswerth, "TCP/IP on the parallel protocol engine," Proceedings of the IFIP TC6/WG6, 4 Fourth International Conference on High Performance Networking IV, Dec. 14, 1992, pp. 119-134.

(56) References Cited

OTHER PUBLICATIONS

C. Traw and J. Smith; IEEE Journal on Selected Areas in Communications, pp. 240-253, Feb. 1993.

E. Ruetsche, "The architecture of a Gb/s multimedia protocol adapter," ACM Computer Communication Review, vol. 23, No. 3, Jul. 1993, pp. 59-68.

Jonathan M. Smith and C. Brendan S. Traw; IEEE Network, vol. 7, Issue 4, pp. 44-52, Jul. 1993.

Jeffrey R. Michel, "The Design and Evaluation of an Off-Host Communications Protocol Architecture," M.Sci. Thesis, University of Virginia, Aug. 1993, 139 pp.

Mark David Hayter, "A Workstation Architecture to Support Multimedia," Ph.D. Thesis, University of Cambridge, Sep. 1993, 111 pp.

Jonathan Kay and Joseph Pasquale; ACM Computer Communication Review, vol. 23, No. 4, pp. 259-268, Oct. 1993.

W. E. Leland, et al.; ACM Computer Communication Review, vol. 23, No. 4, p. 85-95, Oct. 1993.

EP 13187725.0—1953—Extended European Search Report dated Feb. 19, 2014, (6 pages).

EP 13153148.5—1953—Extended European Search Report dated Feb. 19, 2014, 6 pages.

\* cited by examiner

MESSAGE ACCELERATION

BACKGROUND OF THE INVENTION

This invention relates to a data processing system comprising a host computing device configured to perform transport protocol processing and a network interface device configured to perform upper layer protocol processing so as to support low latency upper layer messaging.

In typical computer systems, streaming protocols such as TCP are generally handled in software at a network protocol stack supported at the computer system. This is because handling streaming protocols is expensive to implement in hardware (e.g. at a network interface device) in terms of both processing power and memory requirements. For example, data is transmitted over TCP by encapsulating it in TCP segments that could be dropped, retransmitted and reordered, and as a result a stream of data may not arrive at the receiver in the correct sequence. Thus, TCP streams require that the protocol stack managing the streams can handle out of order packets (which requires a significant amount of storage) and both the receive and transmit paths of a given stream (because the receive and transmit paths of a TCP stream are not independent).

Nevertheless, due to the potential improvements in latency offered by processing TCP streams at a NIC, network interface devices that can perform TCP processing in hardware at a TCP offload engine (TOE) have been developed. Examples include NICs based on the Chelsio T4 and Broadcom BCM5708C chips. Performing protocol processing at the NIC also opens up the possibility of performing upper layer protocol processing at the NIC so as to further minimise the latency associated with communicating upper layer messages over TCP. This is because the transport layer TCP protocol must generally be processed prior to any upper layer protocols—for example, TCP data packets received at a NIC must be correctly reassembled into an ordered stream so as to allow the payload data of those data packets to be re-formed and the upper layer messages extracted for processing by the upper layer protocol stack. Thus, if TCP processing is performed at a NIC, the upper layer protocol processing can also be moved into hardware at the NIC, and the latency associated with upper layer messaging can potentially be reduced.

However, incorporating both a TCP offload engine and an upper layer protocol accelerator in hardware at a network interface device requires even greater processing power and memory to be present at the NIC. This significantly increases the complexity and cost of the network interface device, especially since bespoke hardware solutions such as FPGAs (field programmable gate arrays) are typically used to provide upper layer message processing specific to a particular application. Furthermore, the complexity of an integrated hardware TCP and upper layer protocol solution generally results in long development times and, since the hardware implementing the TCP offload engine and accelerator cannot generally be reconfigured with the same ease with which an updated software transport library can be installed into a host computer system, it is much more difficult to make changes to a hardware implementation (e.g. to fix bugs).

There is therefore a need for a host computer system and network interface device that can support low latency messaging over an upper layer protocol without requiring the complexity and expense of a TCP offload engine in hardware.

SUMMARY

According to a first aspect of the present invention there is provided a data processing system comprising: a host computing device supporting an operating system and a network protocol stack, the network protocol stack being operable to support one or more transport streams by performing transport stream protocol processing of data packets received over the streams; a network interface device arranged to couple the host computing device to a network and operable to receive data packets over a transport stream supported by the network protocol stack; and a message engine configured to perform upper layer protocol processing; wherein the network interface device is configured to, on receiving a data packet over one of a predetermined set of transport streams, pass the payload data of the data packet to the message engine and the message engine is configured to, in response to receiving the payload data, identify and process any upper layer messages in the payload data in accordance with the upper layer protocol.

Preferably the network interface device or message engine is further configured to pass at least the headers of the data packet to the network protocol stack so as to cause the network protocol stack to perform transport protocol processing of the received data packet.

Preferably the network protocol stack is further configured to, in response to receiving at least the headers of the data packet, perform lower layer protocol processing of the received data packet so as to complete protocol processing of network protocols below the transport layer.

Preferably the network interface device passes the payload data to the message engine by making available at least the payload data to the message engine, and optionally the received data packet including its headers and the payload data.

Preferably the network interface device or message engine parses the received data packet so as to identify its payload data.

Preferably the payload data does not comprise any data relating to intervening protocol layers between the upper layer protocol and the transport stream protocol. Preferably the payload data only comprises data relating to the upper layer protocol.

Preferably the message engine is configured to, if the upper layer processing is successful, pass data generated by the upper layer processing to the upper layer endpoint to which the upper layer messages are directed.

Preferably the message engine passes data generated by the upper layer processing to the network protocol stack by writing the data generated by the upper layer processing to a buffer at the host computing device that is accessible to the network protocol stack. Suitably the message engine is configured to, if the upper layer processing is successful, pass data generated by the upper layer processing to the network protocol stack and the network protocol stack is configured to release the generated data to the upper layer endpoint to which the upper layer messages are directed only if the transport stream processing of the data packet is successful and the data packet is determined to have been received in-sequence.

Preferably the network protocol stack is configured to, if the network protocol stack determines that the data packet was received out-of-sequence, discard the data generated by the message engine and cause the upper layer protocol processing of the data packet to be performed in software at the host computing device.

Preferably the message engine is configured to, if the upper layer processing is unsuccessful, signal the network protocol stack to indicate that upper layer processing was unsuccessful, and the network protocol stack is configured to, in response to the signal, cause the upper layer protocol processing of the data packet to be performed in software at the host computing device. Suitably the upper layer protocol processing is performed in software at the network protocol stack or at an application supported by the operating system of the host computing device.

Preferably the message engine is further configured to maintain a packet sequence number for each of the predetermined set of transport streams and to, if the payload data comprises a partial upper layer message, perform the following steps: process the partial upper layer message in accordance with the upper layer protocol; store metadata describing the processing state of the message engine; and on the network interface device receiving a subsequent data packet over the one of the predetermined set of transport streams, check that the packet sequence number of the subsequent data packet indicates that it is the next data packet in the sequence of data packets transmitted over that transport stream, and if so: load the metadata describing the processing state of the message engine and continue upper layer protocol processing of the respective upper layer message; and otherwise, abandon the upper layer protocol processing of the respective upper layer message.

Preferably the message engine is further configured to, on upper layer protocol processing of the respective upper layer message being completed, pass data generated by the upper layer processing to the endpoint to which the upper layer messages are directed.

Preferably the message engine is further configured to, if upper layer protocol processing of the respective upper layer message is abandoned, signal to the network protocol stack so as to cause the upper layer protocol processing of the respective data packets to be performed in software at the host computing device.

Suitably the upper layer endpoint is an application supported by the operating system of the host computing device, the message engine itself, or another hardware engine of the data processing system. Suitably the another hardware engine is a financial trading engine provided at a peripheral device of the host computing system and the upper layer protocol is FIX.

According to a second aspect of the present invention there is provided a data processing system comprising: a host computing device supporting an operating system and a network protocol stack, the network protocol stack being operable to support one or more transport streams by performing transport stream protocol processing of data packets received over the streams; a network interface device arranged to couple the host computing device to a network and operable to transmit data packets over a transport stream supported by the network protocol stack; and a message engine configured to perform upper layer protocol processing; wherein the network protocol stack is configured to, on upper layer data being for transmission over one of a predetermined set of transport streams, form transport stream information sufficient for the message engine to form a data packet without performing transport stream protocol processing and cause the message engine to process the upper layer data in accordance with the upper layer protocol so as to form one or more upper layer messages; and the message engine being configured to, in dependence on the transport stream information, encapsulate the one or more upper layer messages in one or more data packets and cause the network interface device to transmit the data packet over the transport stream.

Suitably the transport stream protocol is TCP and the transport stream information includes: segment sequence number, TCP receive window size, ACK number, source port number, destination port number, maximum segment size, and the TCP options of the TCP stream.

Suitably the upper layer data for transmission is generated at the message engine, at an application supported at the operating system of the host computing device, or at another hardware engine of the data processing system. Suitably the another hardware engine is a financial trading engine provided at a peripheral device of the host computing system and the upper layer protocol is FIX.

Preferably the transport stream information comprises information sufficient for the message engine to form the data packet without performing lower layer protocol processing. Suitably the transport stream information includes one or more of an Ethernet MAC address, a VLAN-id, an IP address and an IP ID.

Suitably the transport stream information comprises a data packet template.

Preferably the message engine is configured to request transport stream information from the network protocol stack on the message engine receiving upper layer data for transmission.

Preferably the transport stream information includes a packet sequence number and the message engine is configured to, if the one or more upper layer messages require more than one data packet, for each additional data packet increment the packet sequence number.

Preferably the message engine is configured to make available to the network protocol stack each data packet it causes to be transmitted.

Preferably the network protocol stack is configured to, if a data packet is to be retransmitted over one of the predetermined set of transport streams, effect retransmission of that data packet by modifying a copy of the data packet made available to it by the message engine and causing the modified copy to be transmitted by the network interface device.

Preferably the message engine is configured to signal to the network protocol stack the packet sequence numbers of any additional data packets it causes to be transmitted.

Preferably the network protocol stack is further configured to signal to the message engine the amount of payload data the message engine is permitted to cause to be transmitted by the network interface device. Preferably the amount of payload data is expressed as a number of data packets or a length of payload data.

Suitably the network protocol stack has access to the upper layer data for transmission and is configured to, if a data packet is to be retransmitted over one of the predetermined set of transport streams, effect retransmission of that data packet by: passing the respective upper layer data for transmission to the message engine along with transport stream information sufficient to generate the data packet for retransmission; or passing the respective upper layer data for transmission to a software entity of the host computing device so as to cause that entity to form the respective one or more upper layer messages and forming the data packet for retransmission at the network protocol stack.

Suitably the lower layer protocols include one or more of IP, IPSec, IEEE 802.3, and IEEE 802.11.

Preferably the network interface device is not operable to perform transport stream protocol processing to completion.

Preferably the message engine is provided at the network interface device or at another peripheral device of the data processing system.

Preferably the network protocol stack is a user level network protocol stack.

Suitably the transport stream protocol is TCP.

BRIEF DESCRIPTION OF THE DRAWINGS

The present invention will now be described by way of example with reference to the accompanying drawings, in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a host computing device and network interface device that together comprise a data processing system. A host computing device could be any kind of computing device, including: a server, a personal computer, a switch, a router, a bridge, a virtualised system (e.g. a virtualised operating system and the applications it supports), and a portable device such as a tablet computer or smartphone. A network interface device could be any hardware device configured to interface a wired or wireless network to a host computing device. The network interface device could be provided in any manner between a network and host device, including: as one or more peripheral devices (such as a PCIe card) of the host computing device, and/or as an integral part of the host computing device (e.g. a LAN on mainboard, or LOM chipset).

Figure 1:
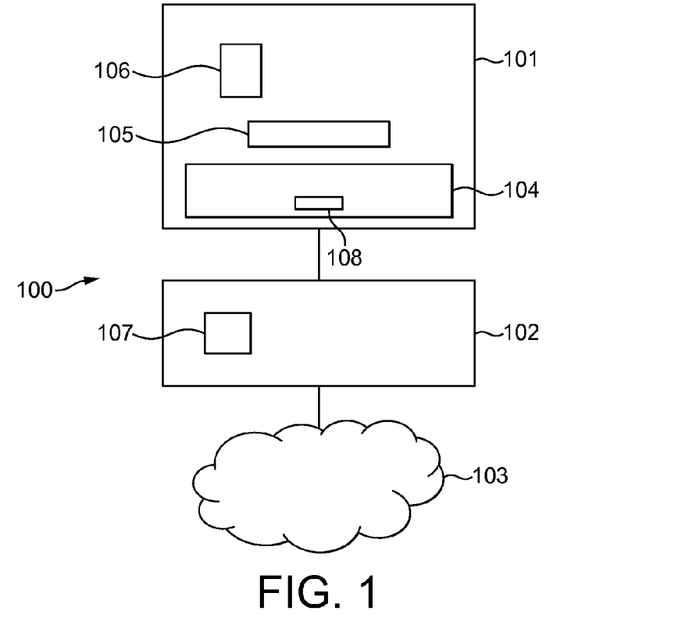
FIG. 1 is a schematic diagram of a data processing system configured in accordance with the present invention.

A data processing system configured in accordance with a first aspect of the present invention is shown in FIG. 1. The data processing system 100 comprises a host computing device 101 coupled to a network interface device 102 that is arranged to interface the host to network 103. The host computing device includes an operating system 104 supporting one or more applications 106 and a network protocol stack 105. The network protocol stack could be provided at the operating system and operate in the kernel context, or it could be a user level protocol stack. The operating system could be a conventional monolithic operating system, a privileged domain (e.g. a hypervisor) supporting one or more virtualised operating systems, or a virtualised operating system itself. There could therefore be multiple software environments (represented by the entities 104, 105 and 106) at the host computing device.

The network protocol stack is configured to process messages formed at the one or more applications 106 so as to encapsulate each message in one or more data packets in accordance with a transport stream protocol such as TCP. The protocol stack would typically also perform protocol processing according to one or more additional protocols. For example, if NIC 102 is an Ethernet NIC, the stack could be configured to form data packets in accordance with TCP, network layer internet protocol (IP) and link layer Ethernet (IEEE 802.3) so as to form data packets having a nested set of protocol headers as follows:

[Ethernet[IP[TCP<payload data>]]]

where transport layer TCP is carried within an IP packet which is carried within an Ethernet packet. It is well known in the art to perform link (e.g. Ethernet) and network layer (e.g. IP) protocol processing at either a host device or a NIC and this will not be discussed further. There may also be additional protocol layers above the transport layer—for example, quality of service protocol layers—and these can also be handled according to any suitable manner in the art, but would preferably be handled at a host device. The present invention concerns a transport stream protocol such as TCP and its payload data representing upper layer protocol messages.

The network protocol stack is shown in FIG. 1 as a single homogeneous unit but could in fact be a collection of multiple processing entities located in hardware (e.g. at the NIC), and/or at the operating system (e.g. running in the kernel context), and/or at user level (e.g. at a user level transport library). The network protocol stack could additionally be capable of handling data flows in accordance with any number of other connected-oriented or connectionless protocols.

The host computing device may transmit data over network 103 by means of the network protocol stack by passing messages to the stack for transmission in accordance with the transport stream protocol. Typically those messages will be configured in accordance with an upper layer protocol such as HTTP (e.g. in the case of data from a web server running at the host) or IMAP (e.g. in the case of data from an email server running at the host).

The network interface device 102 includes a message engine 107 that is configured to process messages in accordance with an upper layer protocol. The message engine could receive data from the host computing device (for example, from application 106) or from an entity accessible over network 103 (e.g. a remote server) and process the received data in accordance with the upper layer protocol. The message engine is preferably controlled by means of a driver 108 at the operating system of the host device (which could be the driver of the NIC). The message engine could alternatively be supported at another peripheral device of system 100.

The first aspect of the present invention recognizes that, particularly in latency critical scenarios, it is often the case that upper layer messages are aligned with transport stream segment boundaries (e.g. TCP segment boundaries) such that each stream segment contains one or more complete upper layer messages. The first aspect of the present invention builds on this insight and provides a low latency messaging architecture that does not require a network interface device having a hardware offload engine configured to perform full transport stream protocol processing. This is achieved by arranging that the network interface device extracts payload data from the data packets of a transport stream and passes the payload data to message engine 107 for upper layer protocol processing. On the optimistic assumption that much of the time the upper layer messages will be aligned with the transport stream boundaries, the message engine will be able to process a useful proportion of the upper layer messages without transport stream processing having been completed.

Typically a predetermined set of transport streams will carry upper layer protocol messages that are to be handled if possible at message engine 107. In the following example, these transport streams will be referred to as TCP streams, but could in fact be transport streams of any protocol. Thus, network interface device 102 is configured to direct to the message engine the payload data of any data packets received at the NIC that belong to the predetermined set of TCP streams. This could be achieved by an entity of the NIC that is not the message engine extracting the payload data from the appropriate TCP packets and passing it to the message engine; alternatively, the message engine could have access to TCP data packets of the predetermined streams that are received at the NIC and itself extract the payload data for attempted upper layer processing.

As mentioned above, protocol layers below the transport layer (e.g. Ethernet and IP layers) could be processed at the NIC, but the present invention does not require that this is the case and preferably no substantial processing of protocol layers other than the upper layer protocol layer is performed at the NIC. Typically some protocol processing of lower layers will be performed at the NIC, such as checking or calculating checksums, or performing encryption/decryption such as IPSEC. The present invention requires that some part of the NIC can identify the payload data of a received data packet that represents messages according to the upper layer protocol. This can be readily achieved by identifying in a data packet those headers/footers/special characters/or other identifying data that delineates payload data of the upper layer protocol. In terms of lower layer protocol processing, the logic required at the NIC can therefore be limited to parsing a data packet to find the start of the payload data. Note that there may be one or more protocol layers between the TCP protocol and the upper layer protocol: in this case any headers, footers or other data relating to the intervening protocols does not form part of the payload data of the upper layer protocol that is passed to the message engine.

On receiving payload data of the upper layer protocol from a TCP data packet, the message engine attempts to process the payload data as if it were one or more upper layer messages. If the upper layer message starts at the start of the payload data and there are an integer number of messages in the payload data, one can expect that the upper layer processing of the payload data will be successful. If the processing is successful, the message engine causes to be passed to the host device one or both of (a) a signal indicating that upper layer processing was successfully performed, and (b) the data formed by the upper layer processing. If the processing is unsuccessful, the message engine signals this result to the host device so that the host knows that the message engine was not able to successfully perform upper layer processing for that data packet.

Upper layer processing could be unsuccessful because the payload data does not contain any messages, because the payload data is corrupted, because messages are received out of order by the message engine, or because only parts of a message are received (e.g. a message could span two or more data packets), because a checksum has failed (at any protocol layer), or because any lower layer frame or segment is fragmented (e.g. the stream could be a TCP/IP stream and the IP frame could be fragmented). This list is not exhaustive and upper layer processing could be unsuccessful for other reasons that would mean upper layer processing should not be performed or the results of any processing should be abandoned. Note that upper layer processing is unsuccessful for a given data packet if upper layer processing starts but does not complete due to an error, if upper layer processing completes but the results are to be discarded (e.g. due to a message being processed out of order), or if upper layer processing is prevented from starting (e.g. due to the respective IP frame being fragmented).

Figure 2:
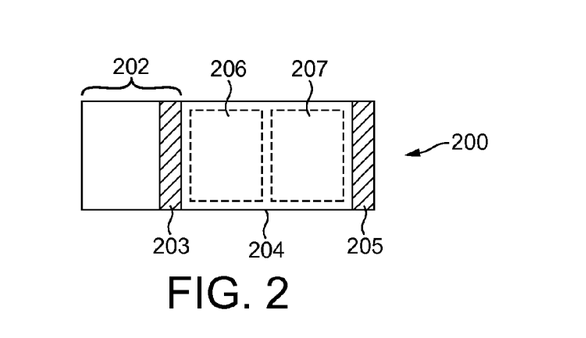
FIG. 2 illustrates the structure of a transport stream data packet carrying two upper layer protocol messages.

An illustration of a data packet 200 carrying two messages 206 and 207 in the payload data 204 of the packet is shown in FIG. 2. The data packet comprises a set of headers 202 that includes a TCP header 203 adjacent to the start of the payload data. Hence, by parsing the data packet and locating the end of TCP header 203, NIC 102 can identify the payload data of the packet comprising the upper layer messages 206 and 207. The packet may additionally include one or more footers 205 that the NIC is further configured to exclude from the payload data it passes to message engine 107.

Additionally, irrespective of whether or not the message engine successfully processes upper layer messages carried in the payload data, the network interface device is configured to pass at least the TCP headers of each data packet to the host so as to allow the host to perform TCP processing of data packets at stack 105. Assuming any data packet integrity checks are performed in hardware at the NIC (e.g. checksum calculations), only the TCP headers are required for stack 105 to complete TCP processing. Optionally, the NIC passes to the host the entire unprocessed TCP segment, including the payload data. The NIC is also configured to pass the headers of any other protocol layers of the data packet for which protocol processing is performed at the host.

In this manner, the message engine is configured to perform upper layer processing of received data packets whenever it is able to. Since the message engine can perform upper layer processing faster than the host stack, a low latency receive data path is provided requiring that the NIC also implement transport stream protocol processing. Any data packets that were not successfully processed by the message engine are at least partly handled at the appropriate upper layer protocol processing entity of the host (e.g. at protocol stack 105): upper layer protocol processing could either be performed in full at the host, or the host could extract the upper layer protocol messages that have not been validly processed at the NIC and pass those back to the message engine for processing once, for example, reassembly of lower layer protocol segments has been completed.

In the case in which the message engine successfully processes messages carried in a data packet, the host is preferably configured to check whether the processing performed by the message engine is valid in light of the TCP processing performed at the host. For example, the message engine assumes that it receives upper layer messages in order, which might not be true if data packets are received out of sequence. Since a given message might be processed in dependence on upper layer protocol state that is modified from one message to the next, processing messages in the wrong order could lead to messages being processed in dependence on incorrect state. If the host determines any processing performed by the message engine to be invalid, the respective data generated by the message engine is discarded and either the host performs the upper layer processing, or the host causes the message engine to re-perform the upper layer processing in respect of the affected messages. These checks are preferably performed at the network protocol stack 105 at the host, and are preferably performed in response to TCP processing being completed by the stack.

Preferably the message engine and/or network interface device are configured to pass the results of upper layer processing performed at the message engine in packet order along with at least part of the data packet (i.e. at least the transport stream headers). Thus, the network interface device and message engine are preferably configured to transmit at least part of the data packet (and optionally all) to the host along with the results of any upper layer processing performed at the message engine on its payload data (e.g. success/failure messages, and the output of the upper layer processing); subsequently the next data packet and the results of its upper layer processing are sent to the host. By interleaving data packets and the results of upper layer processing, the host can keep track of which upper layer processing results relate to which data packet. Alternatively, each data packet and the results of its upper layer processing are labelled by an identifier (for example, an IP address and port number, or a packet sequence number) so as to allow the host to associate the two;

data packets and the results of upper layer processing can then be passed asynchronously to the host.

Data and messages may be passed between the network interface device/message engine and the host stack 105 by any suitable means, including by means of buffers, event queues, and out of band data.

In some implementations of the first aspect of present invention, the data generated by the upper layer processing of messages received over TCP streams will be passed to entities of the host device 101, such as an application 106, for use by those entities. In other implementations of the first aspect of the present invention, the results of upper layer protocol processing performed at the message engine could be used at the NIC or another hardware device.

A preferred embodiment of the first aspect of the present invention will now be described in which a limited set of state of the TCP protocol is maintained by the message engine so as to allow the engine to cope with messages that are not aligned to stream boundaries whilst still not requiring that the NIC supports a TCP protocol stack.

Each TCP data packet (or other transport stream packet) includes an identifier of the stream (e.g. IP address and port number) and a sequence number that identifies the position of the packet in the stream sequence. This information is held in the headers of a data packet and can be readily read from each data packet using simple logic. The stream identification information (e.g. IP address and port number) is used by the NIC to identify which data packets are to have their payload data processed by the message engine in accordance with the invention. In accordance with the preferred embodiment, the message engine 107 is further configured to maintain a sequence number for each stream that is to be handled by the message engine. This sequence number could be the sequence number of the last packet that was received over the respective stream, or it could be the sequence number of the next packet that is expected to be received for that stream. The sequence number of each data packet received over one of the predetermined streams could be written to the message engine by the NIC, preferably as the payload data is passed to the message engine. Alternatively, the message engine could be configured to snoop the sequence number of each received data packet whilst it is held at the NIC.

Figure 3:
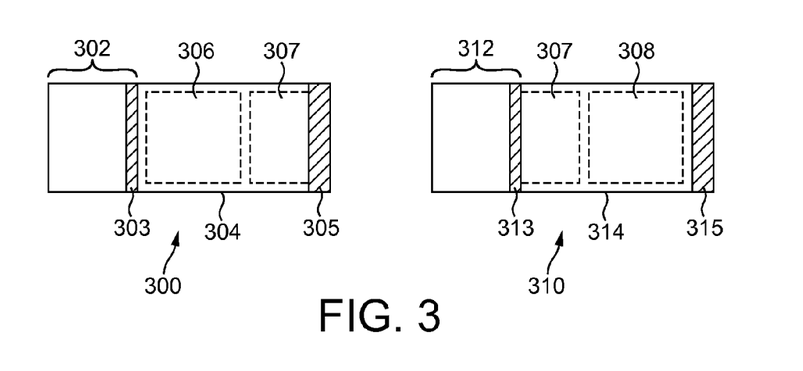
FIG. 3 illustrates two transport stream data packets together carrying three upper layer protocol messages.

The preferred embodiment of the first aspect of the present invention will now be described with reference to FIG. 3, which illustrates a pair of data packets 300 and 310 that are received consecutively at the NIC over a particular TCP stream. The two packets carry three upper layer messages 306, 307 and 308, with message 307 spanning the two packets. The network interface device 102 is configured to parse each data packet so as to identify their TCP headers 303 and 313 in their packet headers 302 and 312, and hence identify the location of the payload data 304 and 314 in the data packets. The packets may also include footers 305 and 315.

On passing payload data 304 of packet 300 to the message engine, the network interface device also passes the TCP sequence number of that data packet, which the message engine maintains for the respective stream. The message engine identifies the first message 306 in the payload data and processes that message in accordance with the upper layer protocol, as has been described with respect to FIG. 2. The message engine then identifies a partial message 307: depending on the nature of the upper layer processing it may be possible to start processing of the partial message and then retain meta-data describing the processing state of the message engine until the next part of the message is received; alternatively, the message engine may retain the partial message and defer processing until the rest of the message has been received. Message parts and/or meta-data describing the processing state of the message engine could be stored at the message engine/NIC, or at a memory at the host. On receiving payload data 314 and the sequence number of the respective data packet 310, the message engine checks that the sequence number of the respective data packet 310 indicates that it is the next in the sequence. If the packets have been received in order, the message engine updates the TCP sequence number it maintains for that stream and proceeds to identify the remaining part of message 307 in the payload data 314. Once message 307 has been reformed using the stored first part of the message, the message engine completes upper layer protocol processing of message 307 (if necessary using the stored upper layer protocol state) and subsequently performs upper layer processing of message 308.

Other aspects of the preferred embodiment operate in the manner described above. For example, if the message engine encounters an error, or the sequence numbers indicate that TCP segments have been received out of order, the message engine signals to the host that upper layer processing of the respective data packet payloads was not successful. The upper layer processing is then either performed at stack 105 following TCP processing of the respective data packet, or the stack passes messages extracted from reassembled TCP segments back to the message engine for processing.

It can be advantageous to allow the NIC to pass decoded upper layer messages to the entity that requires those messages before the host stack has completed protocol processing of the TCP and lower layers. For example, the message engine could be configured to write the decoded messages into an application buffer or the memory of a hardware offload engine at the system for use at the respective application/hardware engine. This allows the entity to which the messages are directed to use the decoded messages as soon as the messages have been decoded—i.e. at the latency of the message engine hardware, and not at the latency of the host software stack.

A second aspect of the present invention will now be described with reference to FIG. 1. The second aspect of the present invention relates to the transmission of upper layer messages generated at the message engine over transport streams by means of the network interface device. Message engine 107 is configured to generate upper layer messages from data that could be generated at the message engine, at another peripheral device of the data processing system 100, or at a software entity of the host device (e.g. application 106). Network interface device 102 is configured to transmit the upper layer messages in data packets over one of the predetermined set of transport streams but the NIC does not include a full TCP stack. Instead, when an upper layer message is to be transmitted, the network protocol stack 105 performs TCP and lower layer transmit processing so as to generate the information required to form the TCP and lower layer headers of the data packet for carrying the upper layer message. This information is passed to the network interface device (preferably the message engine) so as to enable the data packet to be generated for carrying an upper layer message. Typically the necessary TCP information would include one or more of: TCP receive window size, ACK number, segment sequence number, source and destination port numbers, maximum segment size, and any options set for the particular TCP stream. Analogous parameters exist for other transport stream protocols. The information necessary to form lower layer protocol headers might include (for a TCP/IP/Ethernet data packet) Ethernet MAC address, VLAN-ids, IP addresses and IP IDs. The host stack could provide the information by passing a template data packet to the NIC that includes the necessary headers and into which the upper layer message payload can be inserted.

Preferably, the NIC/message engine is configured to request in advance the information required from the host stack 105 to form one or more TCP data packets for carrying the messages so that the NIC can form each TCP data packet as soon as the message engine generates each upper layer message. This allows the upper layer messages to be transmitted at the lowest possible latency and ensures that messages are transmitted at a rate determined by the performance of the message engine.

On an upper layer message being ready for transmission, the network interface device forms the transport layer protocol headers in dependence on the information received from the host stack 105. If the upper layer message to be transmitted can be carried in a single stream segment, the NIC forms the stream segment, includes the message as the payload of the data packet, and transmits the data packet over the appropriate stream. Optionally, the network interface device further sends a copy of the transmitted packet—or just the payload data it has generated for the packet—to the host so as to allow the host stack to handle retransmission requests. Each transmitted data packet could be, for example, written to a buffer in host memory that is accessible to the host stack.

If an upper layer message that is to be transmitted by the NIC is too large to be carried by a single stream segment, the NIC generates multiple data packets sufficient to carry the upper layer message. This can be achieved using the TCP information transmitted to it without requiring the NIC to support a TCP stack. Typically the only parameter the NIC is required to modify in the TCP header from one packet to the next is the sequence number, which the NIC is configured to increment for each additional data packet that it transmits. The NIC is configured to send the updated sequence numbers to the host so as to allow the host stack to update its transmit sequence number for the respective TCP endpoint. This can be achieved by sending a copy of the transmitted data packet to the host and/or transmitting the sequence numbers or payload length of TCP segments transmitted. The NIC could be configured to explicitly signal to the host stack that it has generated additional data packets for the respective TCP stream and notify by means of the signalling the sequence numbers of the additional data packets sent/the total length of payload data transmitted.

So as to ensure that the NIC does not exceed the TCP receive window for a given TCP stream, the host stack preferably signals to the NIC how many packets, or the total length of payload data, that the NIC is permitted to transmit over that stream before making a further request to the host stack for permission (and the necessary information) to transmit data packets over the respective TCP stream.

If retransmission of a data packet formed at the NIC is required, the host stack (which handles the receive path and is therefore notified of the need for a retransmission) can cause retransmission of the appropriate data packet in one of three ways, depending on the information available to it:

The host stack could modify the copy it has of the originally-transmitted data packet that was passed to it by the NIC and transmit the modified copy in a conventional manner by means of the NIC.

The host stack could recreate the data packet from the original input data and TCP parameters provided to the message engine; the upper layer messages can be recreated by the host stack from the original input data and the TCP parameters can be used to form the TCP segment.

The host stack could pass to the message engine the original input data and TCP information so as to cause the message engine to recreate the upper layer messages and allow the NIC to form the TCP segment according to the principles of the present invention.

Note that the source data provided to the message engine for processing into upper layer messages could come from any source, including: from software at the host (e.g. application 106); from the NIC itself (e.g. an offload engine at the NIC, such as a financial trading FPGA); from another device (e.g. another peripheral device of the system). If the source data does not originate at the host (i.e. the data originates at the NIC or another device), the NIC is configured to write to the host at least the payload data (comprising the upper layer messages it has formed) of each data packet it transmits so as to allow the host to perform retransmission of stream segments. If the source data does originate at the host, this may not be required if the host stack has access to the original source data.

In this manner, the substantial logic and memory required to implement a TCP stack in hardware at a NIC is not required, and the host is not required to send the full TCP control block to the NIC. However, the ability of the NIC to form and transmit TCP data packets comprising upper layer messages generated at the message engine is provided without the NIC having to wait for the relatively high latency software stack to generate the required TCP data packets. The formation of TCP data packets is preferably performed at message engine 107, with the information required to generate TCP data packets being passed to the message engine by means of driver 108.

A software entity for managing the NIC could be used to configure which transport streams have their receive and/or transmit paths handled in accordance with the present invention—for example a software entity such as application 106 could indicate to the host stack that all transport streams established with a particular remote server are to be handled according to the low latency mechanisms described herein whenever possible. Alternatively, the host stack could be arranged to use the low latency mechanisms for all transport streams, or all those that meet a predetermined set of criteria.

A message engine 107 of the present invention could be provided as a field programmable gate array (FPGA) at the NIC 102, or at another peripheral device that is arranged to communicate with the NIC over a bus or other interconnect. Such another peripheral device can be considered to form part of NIC 102 shown in FIG. 1.

A first exemplary implementation of the present invention will now be described. Host computing device 101 supports a trading application 106 configured to interact with a remote electronic exchange accessible to the host over one or more TCP streams established over network 103 by means of network protocol stack 105 and network interface device 102. Once a trading strategy has been selected by means of application 106, the host stack configures the message engine of the NIC to place trades at the electronic exchange over the one or more TCP streams under the control of a set of trading algorithms configured to effect the selected trading strategy. The trading algorithms could be supported in software at the host (e.g. at the trading application) or in hardware at a trading engine (which could be at the NIC, and could be part of the message engine). The trades are transmitted to the exchange as messages processed by the message engine in accordance with the FIX (financial information exchange) upper layer protocol and sent over one of the TCP streams. The transmission of these messages is performed in accordance with the second aspect of the present invention.

The message engine would preferably be an FPGA that supports both FIX protocol processing and the trading algorithms configured to effect the selected trading strategy. The trading decisions taken by algorithms at the message engine could be informed by financial data received over the network (e.g. by FIX-Fast over UDP) and processed at dedicated hardware of the NIC (again, this could be at the message engine) or another peripheral device of the system.

Responses from the exchange to the trades placed by the message engine are received as FIX messages over TCP in accordance with the first embodiment of the present invention. Thus, messages from the exchange are decoded at the message engine and delivered to the host. The host stack performs TCP protocol processing, handles any exception cases (e.g. where the FIX processing at the message engine was unsuccessful) and releases the decoded FIX messages to the trading software and/or the trading algorithms so as to inform those entities whether the trades were successful.

Since the upper layer messages received from the remote electronic exchange are mediated over TCP streams configured for low latency, it is likely that messages from the exchange will be aligned with the TCP boundaries of the stream over which they are carried. A significant proportion of the FIX messages received at NIC 102 are therefore likely to be successfully processed in hardware at the message engine without a full TCP stack being provided at the NIC, and without trading decisions being required to wait on relatively slow software stack 105 to perform TCP and upper layer processing. Thus, by performing the trades in hardware at the message engine as close as possible to the physical network, latency is reduced over a software implementation of upper layer processing.

A second exemplary implementation of the present invention will now be described. In this implementation, the data processing system 100 is configured to act as a broker or risk-management agent that operates on a set of TCP streams established between clients and an electronic exchange. A broker or risk-management agent mediates the exchange of FIX messages between clients and an electronic exchange, and may modify the messages exchanged between the two. In accordance with the first aspect of the present invention, the message engine of the NIC of the system is configured to decode each FIX message carried in a TCP data packet and pass the decoded messages to the appropriate entity at the host—typically a host application that is performing the broker or risk-management agent functions. TCP processing is performed at the host stack as described herein.

Once the host application has processed the decoded message and performed any necessary modifications, it causes the message engine to encode the modified message and forward it over the appropriate TCP stream to the intended endpoint (e.g. the exchange or a client). This is performed in accordance with the second aspect of the present invention, with TCP processing being performed at the host, and the message engine being provided with sufficient information to form a TCP packet around the modified FIX message it generates. Typically, the host application would cause the message engine to perform the FIX protocol processing by making a call to the host stack in respect of the appropriate TCP stream. The host stack would recognise that that TCP stream is being handled by the message engine and the stack would therefore hand over FIX protocol processing to the message engine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A data processing system comprising:
   a host computing device supporting an operating system and a network protocol stack, the network protocol stack being operable to support one or more transport streams by performing transport stream protocol processing of data packets received over the streams; and
   a network interface device arranged to couple the host computing device to a network and operable to receive data packets over a transport stream supported by the network protocol stack, said network interface device comprising a message engine configured to perform upper layer protocol processing,
   wherein the network interface device is configured to, on receiving a data packet over one of a predetermined set of transport streams, pass the payload data of the data packet to the message engine and the message engine is configured to, in response to receiving the payload data, identify and process any upper layer messages in the payload data in accordance with the upper layer protocol,
   wherein said message engine processes said upper layer messages before the transport protocol processing have been completed, and is further configured to pass at least the headers of the data packet to the network protocol stack so as to cause the network protocol stack to perform transport protocol processing of the received data packet.

2. A data processing system as claimed in claim 1, wherein the network protocol stack is further configured to, in response to receiving at least the headers of the data packet, perform lower layer protocol processing of the received data packet so as to complete protocol processing of network protocols below the transport layer.

3. A data processing system as claimed in claim 1, wherein the network interface device passes the payload data to the message engine by making available at least the payload data to the message engine, and optionally the received data packet including its headers and the payload data.

4. A data processing system as claimed in claim 1, wherein the network interface device or message engine parses the received data packet so as to identify its payload data.

5. A data processing system as claimed in claim 1, wherein the payload data does not comprise any data relating to intervening protocol layers between the upper layer protocol and the transport stream protocol.

6. A data processing system as claimed in claim 1, wherein the payload data only comprises data relating to the upper layer protocol.

7. A data processing system as claimed in claim 1, wherein the message engine is configured to, if the upper layer processing is successful, pass data generated by the upper layer processing to the upper layer endpoint to which the upper layer messages are directed.

8. A data processing system as claimed in claim 7, wherein the message engine passes data generated by the upper layer processing to the network protocol stack by writing the data generated by the upper layer processing to a buffer at the host computing device that is accessible to the network protocol stack.

9. A data processing system as claimed in claim 1, wherein the message engine is configured to, if the upper layer processing is successful, pass data generated by the upper layer processing to the network protocol stack and the network protocol stack is configured to release the generated data to the upper layer endpoint to which the upper layer messages are directed only if the transport stream processing of the data packet is successful and the data packet is determined to have been received in-sequence.

10. A data processing system as claimed in claim 1, wherein the network protocol stack is configured to, if the network protocol stack determines that the data packet was received out-of-sequence, discard the data generated by the message engine and cause the upper layer protocol processing of the data packet to be performed in software at the host computing device.

11. A data processing system as claimed in claim 1, wherein the message engine is configured to, if the upper layer processing is unsuccessful, signal the network protocol stack to indicate that upper layer processing was unsuccessful, and the network protocol stack is configured to, in response to the signal, cause the upper layer protocol processing of the data packet to be performed in software at the host computing device.

12. A data processing system as claimed in claim 11, wherein the upper layer protocol processing is performed in software at the network protocol stack or at an application supported by the operating system of the host computing device.

13. A data processing system as claimed in claim 1, wherein the message engine is further configured to maintain a packet sequence number for each of the predetermined set of transport streams and to, if the payload data comprises a partial upper layer message, perform the following steps:
  process the partial upper layer message in accordance with the upper layer protocol;
  store metadata describing the processing state of the message engine; and
  on the network interface device receiving a subsequent data packet over the one of the predetermined set of transport streams, check that the packet sequence number of the subsequent data packet indicates that it is the next data packet in the sequence of data packets transmitted over that transport stream, and if so:
    load the metadata describing the processing state of the message engine and continue upper layer protocol processing of the respective upper layer message; and
    otherwise, abandon the upper layer protocol processing of the respective upper layer message.

14. A data processing system as claimed in claim 13, wherein the message engine is further configured to, on upper layer protocol processing of the respective upper layer message being completed, pass data generated by the upper layer processing to the endpoint to which the upper layer messages are directed.

15. A data processing system as claimed in claim 13, wherein the message engine is further configured to, if upper layer protocol processing of the respective upper layer message is abandoned, signal to the network protocol stack so as to cause the upper layer protocol processing of the respective data packets to be performed in software at the host computing device.

16. A data processing system as claimed in claim 1, wherein the upper layer endpoint is an application supported by the operating system of the host computing device, the message engine itself, or another hardware engine of the data processing system.

17. A data processing system as claimed in claim 16, wherein the another hardware engine is a financial trading engine provided at a peripheral device of the host computing system and the upper layer protocol is FIX.

18. A data processing system as claimed in claim 1, wherein the lower layer protocols include one or more of IP, IPSec, IEEE 802.3, and IEEE 802.11.

19. A data processing system as claimed in claim 1, wherein the network interface device is not operable to perform transport stream protocol processing to completion.

20. A data processing system as claimed in claim 1, wherein the network protocol stack is a user level network protocol stack.

21. A data processing system as claimed in claim 1, wherein the transport stream protocol is TCP.

22. A data processing system comprising:
  a host computing device supporting an operating system and a network protocol stack, the network protocol stack being operable to support one or more transport streams by performing transport stream protocol processing of data packets received over the streams; and
  a network interface device arranged to couple the host computing device to a network and operable to transmit data packets over a transport stream supported by the network protocol stack, said network interface device comprising a message engine configured to perform upper layer protocol processing,
  wherein the network protocol stack is configured to, on upper layer data being for transmission over one of a predetermined set of transport streams, form transport stream information sufficient for the message engine to form a data packet without performing transport stream protocol processing and cause the message engine to process the upper layer data in accordance with the upper layer protocol so as to form one or more upper layer messages; and the message engine being configured to, in dependence on the transport stream information, encapsulate the one or more upper layer messages in one or more data packets and cause the network interface device to transmit the data packet over the transport stream.

23. A data processing system as claimed in claim 22, wherein the transport stream protocol is TCP and the transport stream information includes: segment sequence number, TCP receive window size, ACK number, source port number, destination port number, maximum segment size, and the TCP options of the TCP stream.

24. A data processing system as claimed in claim 22, wherein the upper layer data for transmission is generated at the message engine, at an application supported at the operating system of the host computing device, or at another hardware engine of the data processing system.

25. A data processing system as claimed in claim 24, wherein the another hardware engine is a financial trading engine provided at a peripheral device of the host computing system and the upper layer protocol is FIX.

26. A data processing system as claimed in claim 22, wherein the transport stream information comprises information sufficient for the message engine to form the data packet without performing lower layer protocol processing.

27. A data processing system as claimed in claim 26, wherein the transport stream information includes one or more of an Ethernet MAC address, a VLAN-id, an IP address and an IP ID.

28. A data processing system as claimed in claim 22, wherein the transport stream information comprises a data packet template.

29. A data processing system as claimed in claim 22, wherein the message engine is configured to request transport stream information from the network protocol stack on the message engine receiving upper layer data for transmission.

30. A data processing system as claimed in claim 22, wherein the transport stream information includes a packet sequence number and the message engine is configured to, if the one or more upper layer messages require more than one data packet, for each additional data packet increment the packet sequence number.

31. A data processing system as claimed in claim 22, wherein the message engine is configured to make available to the network protocol stack each data packet it causes to be transmitted.

32. A data processing system as claimed in claim 31, wherein the network protocol stack is configured to, if a data packet is to be retransmitted over one of the predetermined set of transport streams, effect retransmission of that data packet by modifying a copy of the data packet made available to it by the message engine and causing the modified copy to be transmitted by the network interface device.

33. A data processing system as claimed in claim 22, wherein the message engine is configured to signal to the network protocol stack the packet sequence numbers of any additional data packets it causes to be transmitted.

34. A data processing system as claimed in claim 22, wherein the network protocol stack is further configured to signal to the message engine the amount of payload data the message engine is permitted to cause to be transmitted by the network interface device.

35. A data processing system as claimed in claim 34, wherein the amount of payload data is expressed as a number of data packets or a length of payload data.

36. A data processing system as claimed in claim 22, wherein the network protocol stack has access to the upper layer data for transmission and is configured to, if a data packet is to be retransmitted over one of the predetermined set of transport streams, effect retransmission of that data packet by:
- passing the respective upper layer data for transmission to the message engine along with transport stream information sufficient to generate the data packet for retransmission; or
- passing the respective upper layer data for transmission to a software entity of the host computing device so as to cause that entity to form the respective one or more upper layer messages and forming the data packet for retransmission at the network protocol stack.

37. A data processing system as claimed in claim 22, wherein the lower layer protocols include one or more of IP, IPSec, IEEE 802.3, and IEEE 802.11.

38. A data processing system as claimed in claim 22, wherein the network interface device is not operable to perform transport stream protocol processing to completion.

39. A data processing system as claimed in claim 22, wherein the network protocol stack is a user level network protocol stack.

40. A data processing system as claimed in claim 22, wherein the transport stream protocol is TCP.

* * * * *